E. B. VALOT.
LIQUID FUEL BURNER.
APPLICATION FILED DEC. 31, 1912.
1,084,117.
Patented Jan. 13, 1914.
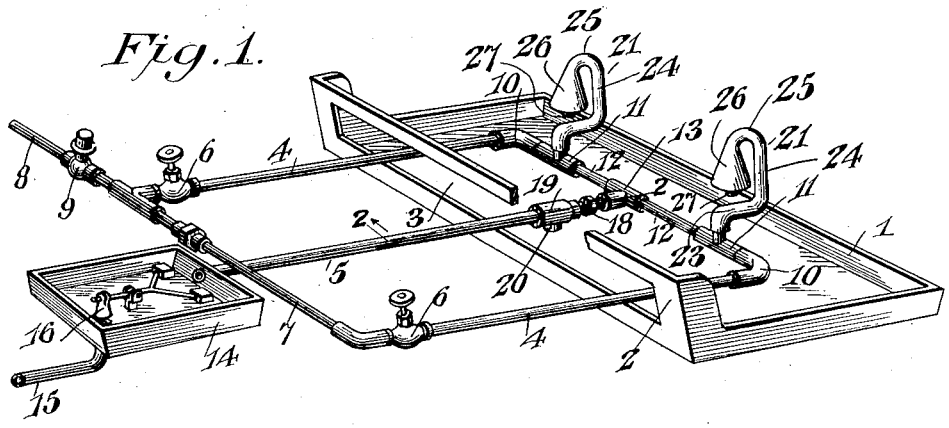
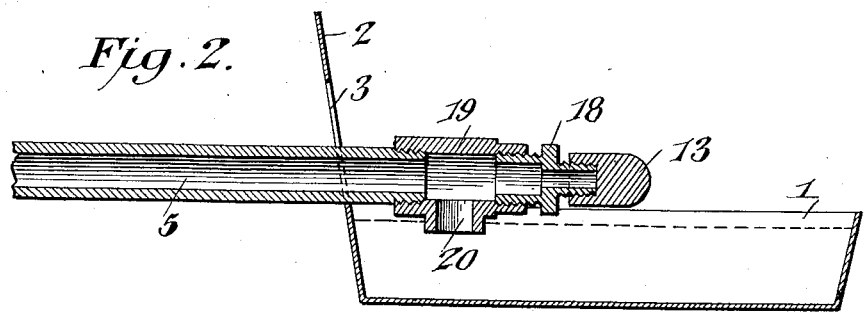
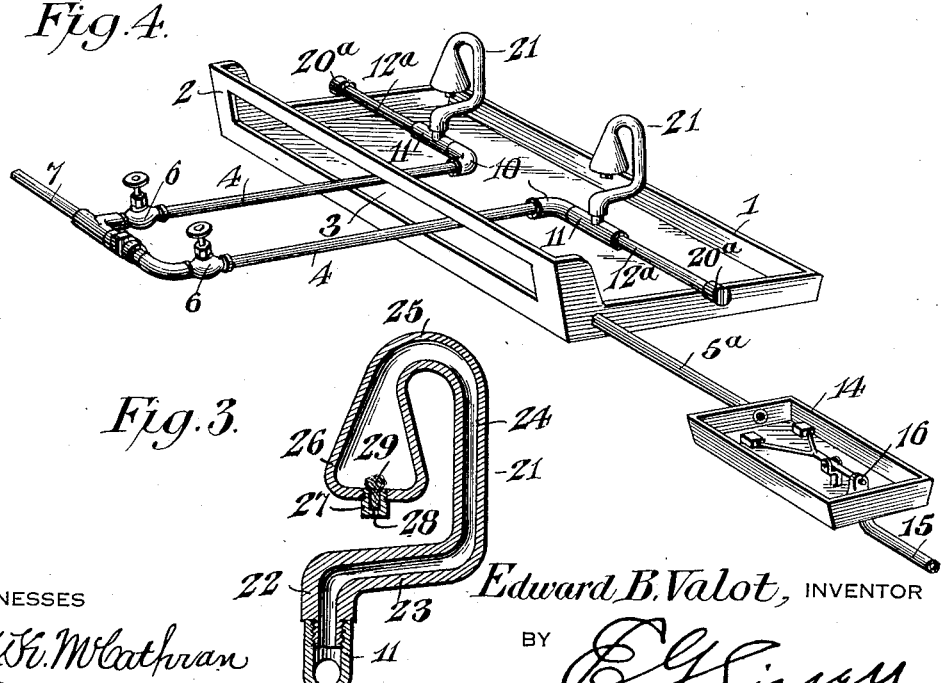
WITNESSES
Jas. H. McCathran
F. T. Chapman
Edward B. Valot, INVENTOR
BY
E. G. Siggers
ATTORNEY

UNITED STATES PATENT OFFICE.

EDWARD BERTRUM VALOT, OF LEES SUMMIT, MISSOURI.

LIQUID-FUEL BURNER.

1,084,117.   Specification of Letters Patent.   Patented Jan. 13, 1914.

Application filed December 31, 1912. Serial No. 739,551.

*To all whom it may concern:*

Be it known that I, EDWARD B. VALOT, a citizen of the United States, residing at Lees Summit, in the county of Jackson and State of Missouri, have invented a new and useful Liquid-Fuel Burner, of which the following is a specification.

This invention has reference to improvements in liquid fuel burners and its object is to provide a burner whereby a particularly efficient combustion of liquid fuel may be brought about.

In accordance with the present invention there is provided a water pan in which there is maintained a supply of water preferably at a constant level and associated with the pan of water is a fuel supply means for liquid fuel which may include one or more nozzles so arranged as to project a jet of burning fuel against the surface of the water in a manner to cause the heat of the fuel to convert the water into steam, and the latter uniting with the burning fuel produces an intensely hot flame.

The invention is adapted to stoves and other like heating devices, while no parts liable to burn out are subjected to the direct action of the flame as it issues from the fuel supply jets. Moreover, the jets are so arranged as to preheat the fuel and to permit a certain expansion of the fuel while in the gaseous form before issuing from the jet, whereby there is produced a marked uniformity of flow while the device is in operation.

The invention will be best understood from a consideration of the following detailed description, taken in connection with the accompanying drawings forming a part of this specification, with the further understanding that while the drawings show a practical form of the invention the latter is not confined to any exact conformity with the showing of the drawings, but may be changed and modified so long as such changes and modifications mark no material departure from the salient features of the invention.

In the drawings:—Figure 1 is a perspective view of a liquid fuel burner constructed in accordance with the present invention. Fig. 2 is a section on the line 2—2 of Fig. 1 but drawn to a larger scale and omitting distant parts. Fig. 3 is a central vertical section through one of the jet devices and drawn to a larger scale than Fig. 1. Fig. 4 is a perspective view similar to Fig. 1 and showing a slightly modified construction.

In the drawings there is shown a pan 1 which may be comparatively shallow and made of cast or sheet metal and of a size and shape adapting it to the fire box of a cook stove or the fire chamber of any heating apparatus, the particular form shown in the drawings being susceptible of modification to fit different styles of stoves or furnaces. One side 2 of the pan or water receptacle 1 is shown as rising to a greater height than the rest of the pan, and through this side or wall of the pan there is produced a longitudinal slot 3 for the passage of fuel supply pipes 4 and a water supply pipe 5 and also providing means whereby the pan may be readily secured to any suitable support. In Fig. 1 each supply pipe 4 is provided with a controlling valve 6 and these supply pipes are connected by another pipe 7 at those ends remote from the pan, while communicating with one pipe 4 directly and with the other pipe 4 through the pipe 7 is a supply pipe 8 in which may be included a check valve 9 or other suitable means for overcoming back pressure. These ends of the pipes 4 remote from the valves 6 may be connected by elbows 10, T's 11 and nipple 12 to a blind T 13, so that the ends of the pipes 4 are mechanically joined together within the limits of the pan 1 and may pass through the slot 3 and rest for support upon the corresponding side of the pan. At any appropriate point sufficiently distant from the pan 1 or the stove or furnace in which it is installed, is a water supply pan or tank 14 receiving water through a pipe 15, and containing a suitable float valve 16. This pan or tank 14 is connected by the pipe 5 to the blind T 13 by a nipple 18 and a T 19, so that the pipe 5 may be passed through the slot 3 and be supported upon the bottom wall of the slot, while the open stem of the T 19, indicated at 20, may be directed downwardly into the pan 1. The water tank 14 may be considered simply as typical of any suitable source of controllable water supply or to water works where the control is automatic, so that there will be maintained in the pan 1 a substantially constant level of water, this water being evaporated by the flame jets, and consequently requiring renewal. The pipe 15 may come from any suitable source of supply which in dwelling houses or other similar buildings would be the street water supply, and this is controlled by the float valve 16, so that water flows into the tank 14 only as needed to gravitate into the pan 1. The blind T 13 serves as a support for the corresponding end of the pipe 5 without any communication between the pipe 5 and the fuel supply pipes.

In Fig. 4 the supply pipes 4 have continuations 12ª beyond the T's 11, and these continuations may be closed by caps 20ª and rest upon the ends of the pan 1 instead of being brought together into a common connecting member 13. Also in Fig. 4 the tank 14 is connected to the pan 1 by means of a pipe 5ª, but otherwise the structure is the same in both figures.

Connected to each T 11 is a jet device 21 best shown in Fig. 3. Considering the neck of the T 11 as upright, the jet device 21 has a short upright portion 22 screwed into the T and from thence the jet portion in the form of a substantially cylindrical pipe or duct has a nearly horizontal branch 23 continued in the form of an upright branch 24 having a return bend 25 terminating in a laterally expanded end 26 which may be approximately conical with the base downward and over the substantially horizontal portion 23. In the base of the conical terminal portion 26 is a nipple 27 having a fine jet orifice 28 directed downwardly against the branch 23 of the duct of the jet device, while the nipple also contains fibrous material 29 serving to distribute fluid to the jet and prevent clogging of the fine orifice 28.

Let it be assumed that a suitable supply of water is within the pan 1 and that fuel is being furnished through the pipes 4 to the jet devices 21, there being two such jet devices shown in the drawings, but it will be understood that one jet device may be employed or more than two may be employed, in accordance with the desired heat. Either by preheating the jet devices, or permitting them to burn at low flame for a short time, the fuel which may be in liquid form supplied through the pipes 4 is converted within the duct or neck portion of the jet device into a gas which will flow through the members 23, 24 and 25 into the chamber within the expanded terminal or head portion 26 of the jet member where expansion of the interior of the head 26 serves to form an equalizing chamber which will cause a steady issuance of gasified fuel through the fibrous material 29 to and through the jet orifice 28, and this fuel being ignited burns against the portion 23 of the neck of the jet maintaining it in a hot condition sufficient to thoroughly gasify a liquid fuel, while the flame spread by the neck 23 and issuing under considerable force from the jet because of the pressure of the liquid fuel, strikes the surface of the water and converts a material portion of the water into steam which by the flame becomes more or less superheated and uniting with the constituents of the flame may become resolved into its constituent gases to reunite with the production of great heat in the flame, thereby bringing about the most perfect combustion of the fuel.

The pan 1 may be made of cast iron or sheet iron, these being usually preferred to other materials, and the piping may be such as is readily obtained upon the market in commercial forms and sizes. The jet members, however, are preferably castings of bronze or similar metal shaped substantially as shown in the drawings, although not necessarily confined to any particular shape.

What is claimed is:—

1. A burner for liquid fuel comprising a water receptacle, means for maintaining therein a constant level of water, and a jet device comprising a one-piece structure consisting of a substantially horizontal part when the device is in operative position, a portion uprising therefrom, and a return portion to which the uprising part is connected, said return portion gradually expanding into a laterally enlarged head, and a downwardly directed jet member in the enlarged portion of the head in position to discharge on the substantially horizontal portion to spread a jet of burning fuel into contact with water in the water receptacle, and means for supplying the jet member with liquid fuel.

2. A liquid fuel burner comprising a freely open shallow water pan, means for maintaining a constant level of water in the pan, and a fuel supply pipe entering the pan from one side and supported thereby and provided with a terminal jet member with a substantially horizontal part and an uprising and return part having a jet orifice directed downwardly toward the horizontal member to discharge liquid fuel thereon and therefrom into engagement with the surface of the water.

3. A liquid fuel burner comprising a freely open shallow water pan, means for maintaining a constant level of water therein, and means for directing a jet of liquid fuel toward and against the water in the pan, said means having a fuel duct interposed between the jet and the water.

In testimony that I claim the foregoing as my own, I have hereto affixed my signature in the presence of two witnesses.

EDWARD BERTRUM VALOT.

Witnesses:
 FRANK C. LEWIS,
 R. F. LEWIS.